United States Patent
Gluf, Jr. et al.

[11] Patent Number: 5,937,898
[45] Date of Patent: Aug. 17, 1999

[54] OVERMOLDED FRAME BUS WITH INTEGRAL PRESSURE SWITCH

[75] Inventors: Carl G. Gluf, Jr., Chesterfield; Larry P. Bennett, Franklin; John A. Ness, Birmingham, all of Mich.

[73] Assignee: Eaton Corporation, Cleveland, Ohio

[21] Appl. No.: 08/637,997

[22] Filed: Apr. 25, 1996

[51] Int. Cl.[6] .................................................... F16K 37/00
[52] U.S. Cl. ........................ 137/560; 137/884; 200/83 P
[58] Field of Search ................................... 137/560, 884, 137/554; 200/83 P, 83 N

[56] References Cited

U.S. PATENT DOCUMENTS

| | | | |
|---|---|---|---|
| 556,718 | 10/1896 | Nagai et al. | 137/884 |
| 4,815,496 | 3/1989 | Nishitani et al. | 137/884 |
| 4,938,258 | 7/1990 | Sato | 137/884 |
| 5,088,383 | 2/1992 | Wardle | 137/884 |
| 5,333,647 | 8/1994 | Fukano et al. | 137/884 |
| 5,437,306 | 8/1995 | Asou et al. | 137/884 |
| 5,458,048 | 10/1995 | Hohner | 137/884 |
| 5,549,139 | 8/1996 | Perkins et al. | 137/884 |
| 5,617,898 | 4/1997 | Nagai et al. | 137/884 |
| 5,669,830 | 9/1997 | Hayashi et al. | 137/554 |

*Primary Examiner*—Denise L. Ferensic
*Assistant Examiner*—Joanne Y. Kim
*Attorney, Agent, or Firm*—Roger A. Johnston

[57] ABSTRACT

A valve assembly having solenoid valves mounted on a manifold or block for, upon energization, controlling flow in selected passages. A bus frame of overmolded bus strips has portions of the strips exposed for connection directly to the solenoids. A pressure switch capsule is received in a ported cavity in the manifold or block and located such that a snap disk on the pressure switch contacts exposed surfaces of end portions of two of the bus strips for completing a circuit responsive to sensed pressure in the block cavity.

5 Claims, 3 Drawing Sheets

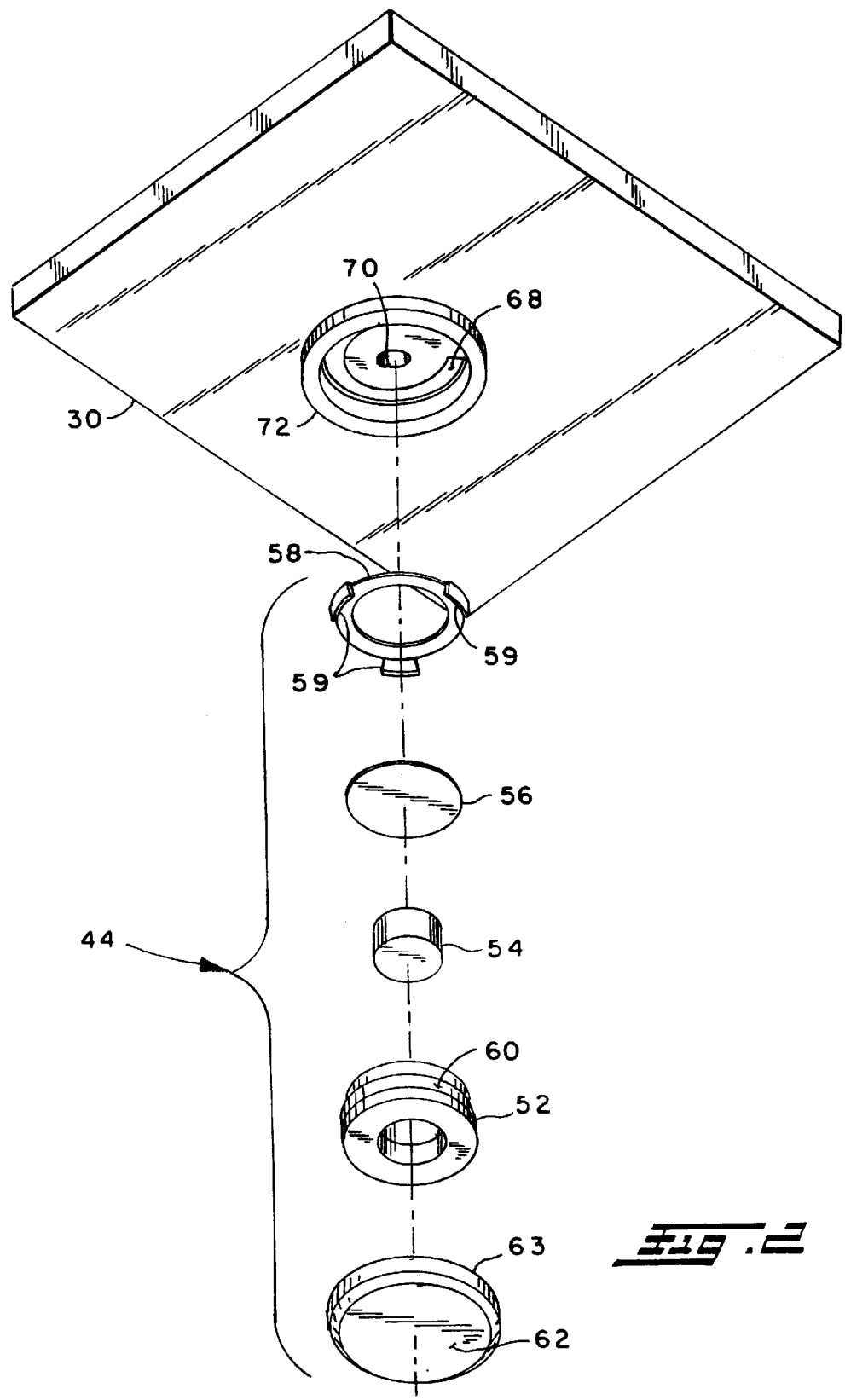

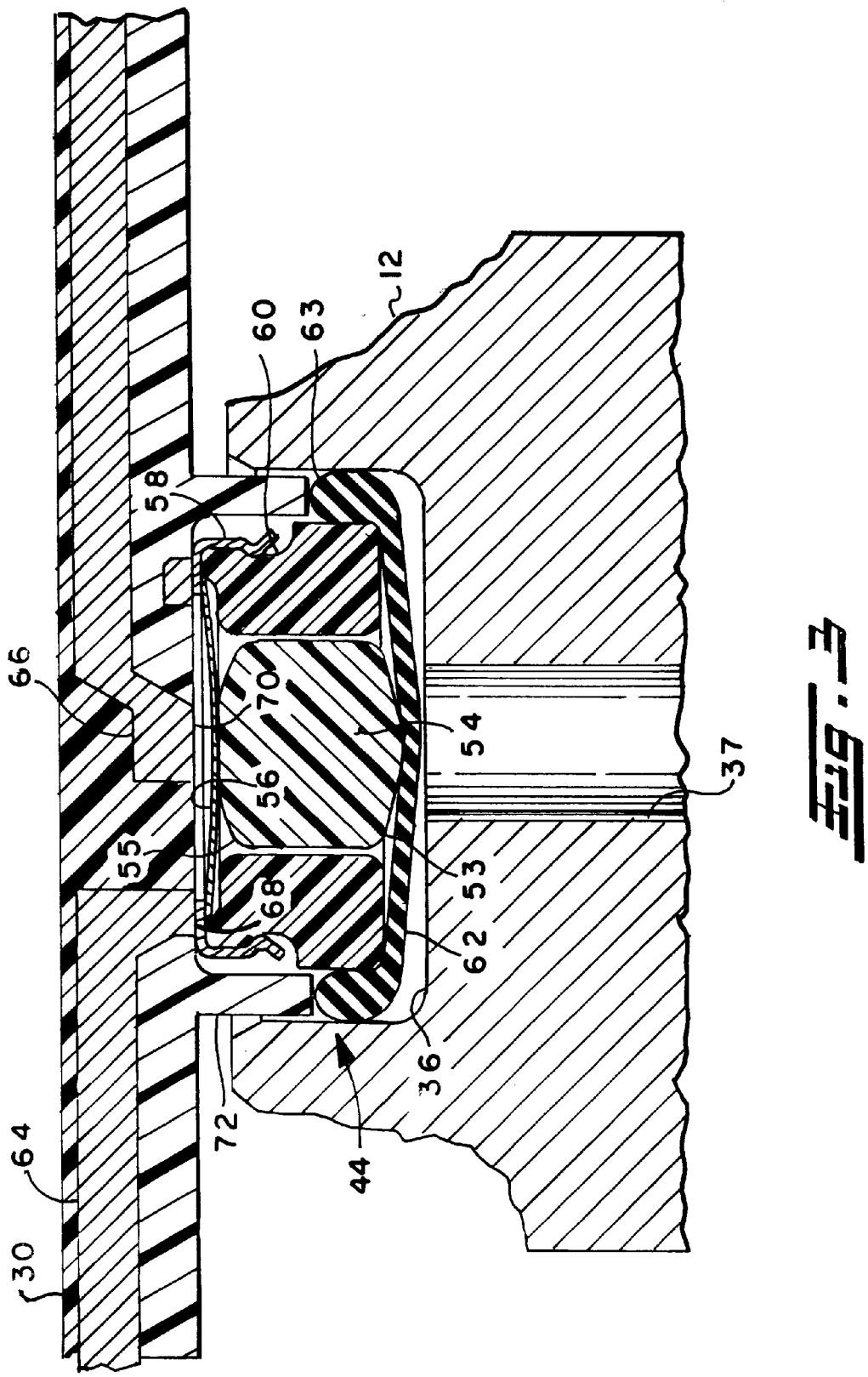

5,937,898

OVERMOLDED FRAME BUS WITH INTEGRAL PRESSURE SWITCH

BACKGROUND OF THE INVENTION

The present invention relates to manifolded valve assemblies of the type wherein a plurality of remotely controlled servo actuated valves are mounted for actuation on a manifold for, upon individual energization, directing fluid flow between selected inlets and outlets of the manifold. Such servo actuated valve arrangements are utilized in electrically controlled automatic power transmissions employed in automotive applications wherein a microcomputer controls the energization of individual valves for controlling the flow of hydraulic fluid to initiate a desired transmission function.

Heretofore, in the design and manufacture of such manifolded servo actuated valve assemblies, it has been known to electrically connect a plurality of the servo valve actuators by a common bus frame received over the valve actuators with busses in the frame electrically connected to the individual valve operators as, for example, solenoids.

In high-volume mass production of motor vehicles having such microcomputer controlled transmission valve assemblies, it has been desired to provide a pressure responsive device in the manifold to provide an electrical signal in the event of hydraulic pressure reaching certain predetermined levels, as for example, overpressure or loss of service pressure.

In certain applications for automotive electronically controlled automatic transmissions, it may be desired to sense the pressure in a plurality of chambers or passages in the manifold; and, thus a plurality of discrete sensors may be required. In such circumstances, it has been found that the attachment of a plurality of individual pressure switches to the manifold and the interconnecting of the wiring thereon has been prohibitively costly for high-volume mass production of motor vehicle transmissions. Accordingly, it has been desired to find a way or means of individually electrically sensing the pressure in a plurality of passages in a manifolded servo valve assembly, and particularly for such an assembly employed in the control of motor vehicle automatic transmissions, and to provide such pressure sensing in a manner that is low in manufacturing cost and easy to assemble in high volume production.

SUMMARY OF THE INVENTION

It is an object of the present invention to provide a pressure sensor formed integrally with an electrically connected bus frame for use with a plurality of electrical valve operators employed in a manifolded bank of servo actuated valves.

It is a further object of the present invention to provide an integral pressure switch in a plurality of manifolded servo actuated valves in which a common bus frame provides electrical connection to the servoactuators and to the pressure sensors.

It is a further object of the present invention to provide a plurality of manifolded servo actuated valves for use in an electrically controlled automotive power transmission in which a common bus frame is connected to the valve servo actuators and in which at least one pressure switch is integrally disposed in the bus frame connection.

The present invention provides a manifold block having a plurality of solenoid actuated valves mounted thereon with a common bus frame providing direct electrical connection to the solenoids and direct electrical connection to at least one pressure switch mounted in the manifold for responding to pressure in one of the valved passages; and, preferably a plurality of pressure switches are provided for responding individually to pressure in selected passages.

BRIEF DESCRIPTION OF THE DRAWINGS

FIG. 2 is an exploded view of one of the pressure sensor installations; and, FIG. 3 is a section view of one taken along section-indicating lines 3—3 in FIG. 1.

DETAILED DESCRIPTION

Figure 1:
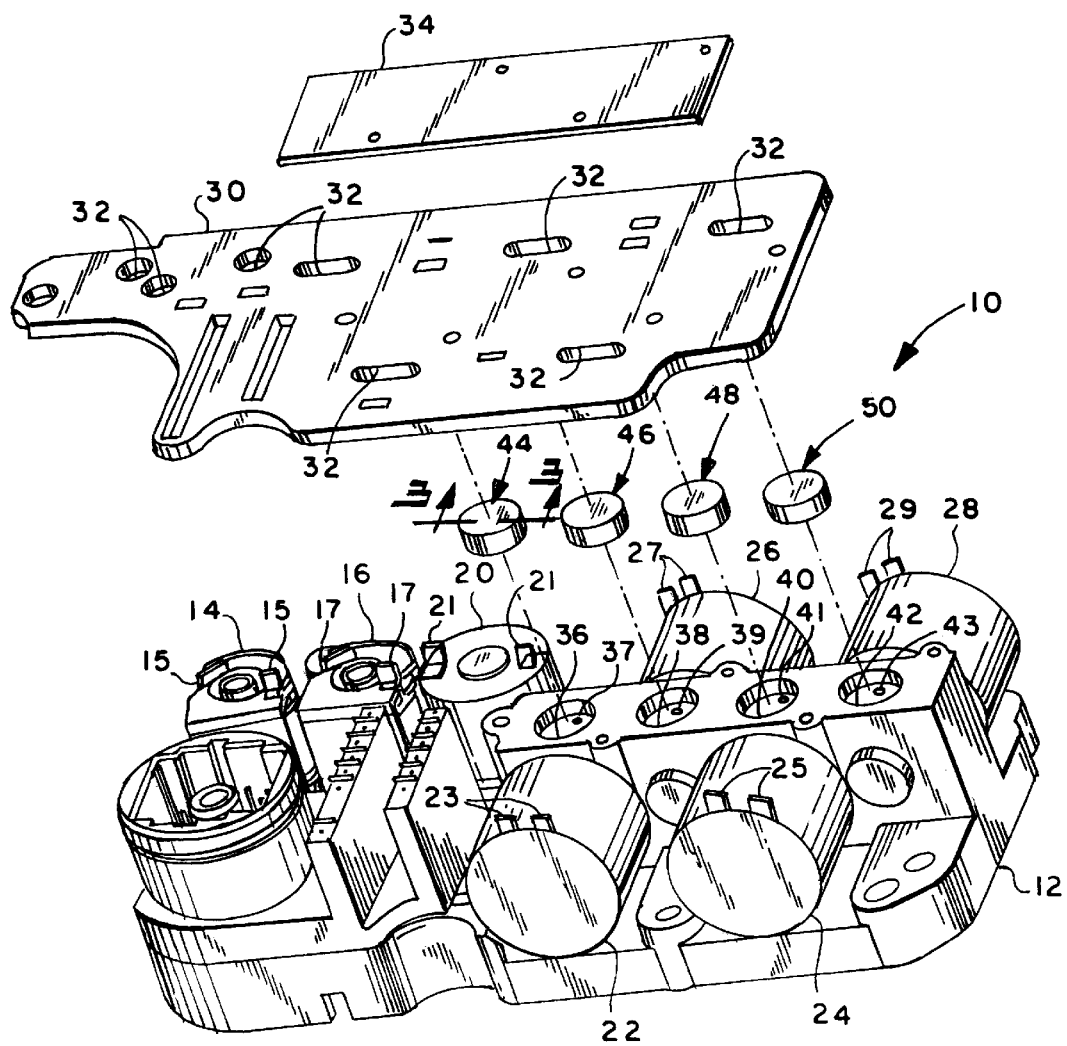
FIG. 1 is an exploded view of a manifold block having a plurality of servo actuated valves thereon and a common bus frame for connecting to the servoactuators and the pressure sensors.

Referring to FIG. 1, the present invention is illustrated as applied to an assembly indicated generally at 10 of a manifold or valve block 12 having a plurality of individual servo actuated or operated valves, preferably by solenoids, mounted on the block 12 as indicated by reference numerals 14 through 28. Each of the valve operators 14 through 28 is operable to control flow between an inlet passage (not shown) and an outlet passage (not shown) provided on the undersurface of the block 12. Such manifolded valve arrangements are typically employed in controlling hydraulic fluid flow in an electronically controlled automatic power transmission for motor vehicle applications.

Each of the solenoid operators 14, 16, 20, 22, 24, 26, 28 has a pair of electrical connection terminals extending upwardly therefrom as denoted by the reference numerals 15, 17, 21, 23, 25, 27, 29. A bus frame or plate 30 has a plurality of electrical conductors or bus strips embedded therein by overmolding of plastic material thereover; and, the strips have portions thereof exposed in apertures such as apertures 32 formed in the plate 30 and into which electrical connection is made by assembly of the plate 30 onto the block 12. If desired, a cover plate 34 may be attached over at least portions of the plate 30.

Referring to FIG. 1, the block 12 has a plurality of sensing cavities 36 through 42 formed therein, each of which communicates with one of the valving passages as denoted by reference numerals 37, 39, 41, 43. A plurality of pressure sensors, preferably pressure switches, indicated generally by reference numerals 44 through 50 is provided with one of the switches disposed in each of the cavities 36 through 42 and makes electrical contact with suitable electrical connections (not shown in FIG. 1) in the bus plate 30 as will hereinafter be described in greater detail.

Referring to FIGS. 2 and 3, a typical one of the pressure sensors 44 is illustrated and includes an annular body or ring 52 which has a plunger or piston 54 centrally received therein with a snap disk 56 received over the upper surface of the body 52 and retained thereon by a suitable retaining ring 58 which has tab portions 59 thereof engaging a groove 60 formed on the outer periphery of the ring 52. An elastomeric diaphragm 62 having a thickened bead or rim portion 63 is received over the outer periphery of ring 52 on the undersurface thereof.

Plate 30 has formed therein a pair of electrical conductors 64, 66 each of which has a portion thereof exposed on the undersurface of the plate 30 in spaced relationship and thereby form electrical contacting surfaces as denoted by reference numerals 68, 70.

The pressure switch assembly 44 is typically received in the cavity 36 in a manner wherein the bead rim or ring 63 of the elastomeric diaphragm 62 is compressed radially and seals about its outer periphery on the cylindrical wall of cavity 36 and on its inner periphery about the ring 52. The diaphragm rim 63 is retained in the cavity 36 by an annular rib portion 72 depending from the undersurface of plate 30, which annular rib 72 surrounds the exposed contact surfaces 68, 70.

In operation, as pressure is applied through valving passage 34, the summation of the pressure forces acting over the surface of diaphragm 62 are applied locally to the convex surface 53 of piston 54 which pushes the piston upwardly so that the convex surface 55 on the upper end of the piston 54 applies a localized central force or load to the snap disk 56 causing the disk to snap upwardly and make electrical contact with spaced contacts 68, 70 thereby completing a circuit therebetween. It will be understood that the summation of the pressure forces acting on diaphragm 62 is concentrated and localized by the convex surfaces of the piston to apply an essentially concentrated central load on the snap disk 56. This arrangement provides a clean or crisp snap-action to the disk and maximizes the differential force required to effect upward snap of the disk and the reduced force at which the disk returns to the position shown in solid outline in FIG. 3. The differential force required to effect the upward snap-action of disk 56 and the force required to permit return of the disk to its at rest position provides a useful differential of the pressure forces required on diaphragm 62 to effect actuation and deactuation of the switch and thus enhances the application of the switch to a motor vehicle power transmission application.

The present invention thus provides a unique and novel way of providing individual pressure sensors at a minimized manufacturing cost in a manifolded bank of solenoid valves which are connected to a common lead or bus frame for effecting energization thereof. In the present invention, a pressure sensor capsule preferably including a snap-acting disk is received in a cavity formed in the manifold block and the capsule is nested between the cavity and the electrical bus frame and automatically connected thereto to provide electrical indication of the sensed pressure function.

Although the invention has hereinabove been described with respect to a certain illustrated embodiment, it will be understood that the invention is capable of modification and variation and is limited only by the following claims.

We claim:

1. A valve assembly comprising:
   (a) a valve body means having a plurality of moveable valve operators thereon;
   (b) a plurality of solenoid operators, each disposed on said body means for, upon energization, effecting movement of one of said valve operators;
   (c) a bus frame or deck connected to each of said solenoid operators, said deck having a plurality of electrically conductive busses or strips overmolded commonly with insulating material with portions of each of said busses exposed for electrical connection individually to one of said operators;
   (d) shorting means disposed in proximity to each of said exposed portions and operable, upon movement, to complete electrical contact between said exposed portions of said busses; and,
   (e) said body means including pressure responsive means, operable in response to a fluid pressure signal in said body means for effecting said movement of said shorting means.

2. The valve assembly defined in claim 1, wherein said body means defines a cavity communicating with a fluid pressure signal port; and, said pressure responsive means is sealed in said cavity.

3. The valve assembly defined in claim 1, wherein said pressure responsive means includes snap-acting disc.

4. The valve assembly defined in claim 1, wherein bus frame includes a tin-plated brass stamping overmolded with plastic material.

5. A valve assembly comprising:
   (a) valve body means having a plurality of fluid valves thereon each having an electrically energized operator;
   (b) a bus frame or deck connected to each of said valve operators, said deck having a plurality of electrically conductive busses or strips overmolded commonly with insulating material with portions of each of said busses exposed for electrical connection individually to one of said operators; and,
   (c) pressure responsive means, including electrical contact means, disposed on said body means, said pressure responsive means operable in response to a fluid pressure signal in said body means for moving said contact means to complete electrical contact between said exposed portions of said busses.

\* \* \* \* \*